May 29, 1928.
M. JACOBSON
1,671,473
ELECTRICAL INSTRUMENT
Filed July 9, 1924
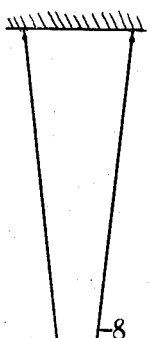
Fig. 1
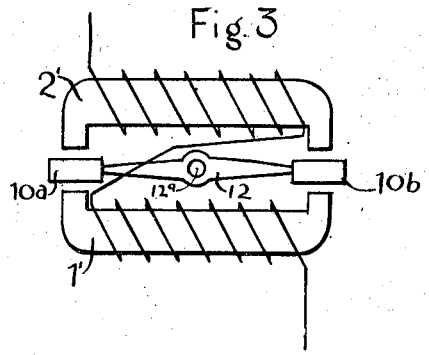
Fig. 2    Fig. 3
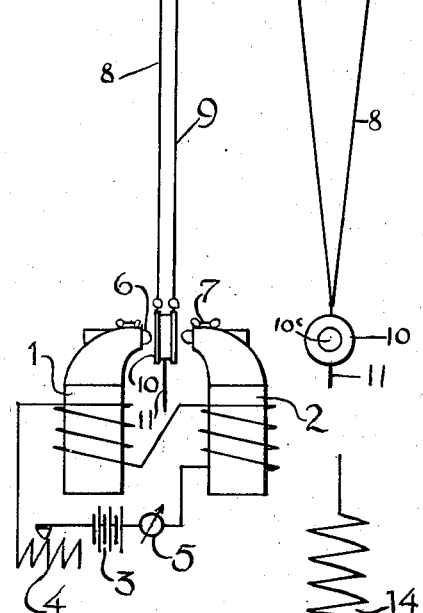
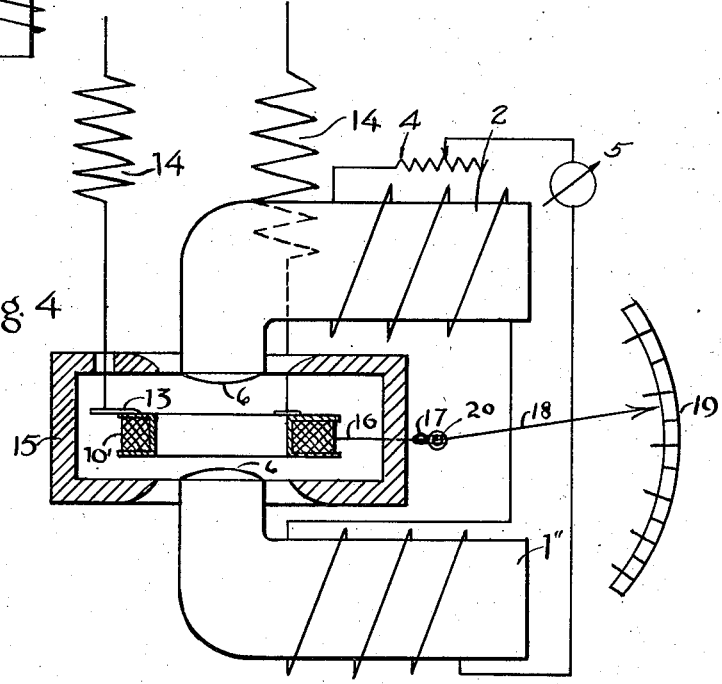
Fig. 4
Inventor
Moses Jacobson Patented May 29, 1928.

1,671,473

UNITED STATES PATENT OFFICE.

MOSES JACOBSON, OF CAMDEN, NEW JERSEY.

ELECTRICAL INSTRUMENT.

Application filed July 9, 1924. Serial No. 725,066.

My invention relates to electrical instruments which give a deflection of a movable part under the influence of an electric current, for the purpose of measuring a characteristic of said current such as in a galvanometer, amperemeter, voltmeter, wattmeter, watthourmeter and the like, or for the purpose of closing and breaking a secondary circuit such as in a relay, electromechanical switch and the like, or for the purpose of transforming electrical oscillations into sound waves such as in a telephone receiver, loud speaker and the like, or for the purpose of performing by an electrical current any mechanical action.

The object of my invention is to provide a more sensitive instrument than hitherto known.

Another object of my invention is to provide an instrument which can be used for a very broad range of current intensities without shunts or additional resistances.

A further object of my invention is to give instead of the rotational deflection of the moving part as in most of the hitherto known instruments, a translational deflection, with the same or even with a higher sensitivity than in the rotational deflection type.

A further object of my invention is to provide an instrument, which will be simple to manufacture and therefore cheap.

Still further objects and advantages of my invention will appear hereinafter in the course of the description.

In the accompanying drawings:

Figure 1 shows a side elevation of one form of the new instrument, destined to be used preferably as a laboratory galvanometer.

Figure 2 shows another side elevation, at right angles to that shown in Figure 1, of the movable system of the same instrument.

Figure 3 shows another form of my invention.

Figure 4 shows a side elevation of an embodiment of my invention as a cheap instrument for technical purposes.

In the hitherto known electrical instruments always a uniform magnetic field was used produced by two opposite poles of a magnet or an electromagnet. In my invention, I use the non-uniform field produced by opposing similar poles of magnets or electromagnets of the same intensity. The magnetic field between similar and equal poles rapidly decreases from a high value at the poles to zero in the middle between them. A coil placed in such a field, in the middle between two poles, with its winding at right angles to the line joining the poles, when a current flows through, will be pushed by one of the poles and pulled by the other in the direction of one of them. A mathematical investigation shows, that the deflecting force is proportional to the number of turns in the coil, to the current in it, to the drop of magnetic field intensity from the pole to the zero position, and to the square of the radius of the coil windings. The last relation gives an opportunity substantially to increase the sensitivity by increasing the radius of the coil, which opportunity does not exist to such extent in the instruments with a uniform field. A further possibility to increase the senitivity in this instrument is due to the translational movement of the coil, which is allowed by attaching the coil to a lever arm to convert the small translational movement into a large angular deflection.

In Figure 1 a narrow flat coil 10, is shown hung from the ceiling or a suitable support by a long quadrifilar wire suspension 8, 9, which forms when moving a parallelogram and which allows the coil to perform a swinging movement without rotation. The same wires 8, 9, serve to pass the current to and from the coil.

To the lower end of the coil is attached a pointer 11 to observe the deflections by means (not shown in the drawing) of a microscope placed in front thereof or a small lamp placed behind thereof and producing a shadow picture of the pointer on a remote scale. The coil 10, when no current is in it, is placed between the pole pieces 6, of an electromagnet 1, 2, and the positions of the pole pieces 6 are adjusted and fixed by screws 7 to give the desired drop of magnetic field, thereby regulating the sensitivity, and to have the coil 10 in the middle between the poles. The current to energize the electromagnet is furnished by a battery 3, and can be kept constant by means of the rheostat 4 and the amperemeter 5.

The coil 10, as shown in Figure 2, is provided with an opening 10°, large enough to allow the coil to slip over the pole pieces without touching them. Thereby the range of available space for the deflection is substantially increased. To secure the highest possible sensitivity the pole pieces must be brought together to a certain minimum distance between their ends. This distance may be so small that the pole ends will be inside the coil, when the latter is in its undeflected position, and then the described shape of the coil would become even necessary. But as the position of the pole ends giving the maximum sensitivity depends upon the size of the coil and the construction of the electromagnet, it is possible and preferable to construct the instrument so that there will be considerable free space left for the coil to be deflected before it begins to slip over the pole pieces.

The back directing force in this form of instrument is gravity. The damping is partly electromagnetic, produced by the eddy currents in the metallic frame of the coil, and partly mechanical, produced by the air friction of the coil, especially when moving over the pole pieces. The air damping can easily be increased to give a dead heat deflection by enclosing the coil in a casing, having only narrow slits for the suspension and the pointer.

For the purpose of measuring weak currents, the current to be measured is passed through the suspension 8, 9, into the coil, and the field of the electromagnet 1, 2, is excited and kept constant by the above described means. But the same instrument can be used to measure strong currents: in this case the coil is energized by a current from a standard cell passing through a big standard resistance, and the current to be measured is passed through the windings of the electromagnet.

Obviously the range of currents to be measured can be easily and very conveniently changed in broad limits by changing the resistance in the electromagnet circuit in the case when weak currents are measured, and by changing the resistance in the coil circuit, when strong currents are measured.

A further means to change the range of measurable currents is provided by increasing the space between the pole ends. Thus it is possible with one instrument of the type described to measure practically all currents from a certain maximum to a certain, very small minimum.

In a rough model of the type of instrument described, built by the inventor in an early stage of development, with a current of 10 amperes in the electromagnet, producing a drop of magnetic field intensity of 5000 gauss through 0.5 cm., and with a current of $10^{-8}$ amperes in the coil, a deflection of 0.01 mm. was obtained. The coil was 8 mm. thick and had an external diameter of 2 cm. 500 turns with a resistance of nearly 200 ohms and a total weight of 20 grammes; the coil suspension had a length of 300 cm., and the period was 3 seconds. By increasing the number of turns, by increasing the diameter of the coil and decreasing its thickness the sensitivity of this type can easily be brought to $10^{-10}$ amperes.

The sensitivity can be increased still more than 10 times by connecting two similar coils $10^a$ and $10^b$, in series and attaching them to an arm 12, which is rotatable around an axis $12^a$ going through its middle, as shown in Figure 3. This instrument has two electromagnets 1' and 2' so connected with the source of E. M. F. and with each other, that they face each other with similar poles. Thus one of the coils $10^a$ and $10^b$ is between two north poles and the other between two south poles. Obviously, when the same current passes through the coils and both are similarly wound, the action of the electromagnets on them is in opposite directions, and therefor both produce a rotation of the arm 12 in the same sense.

For highly sensitive laboratory instruments of the type described, gravity control may be used. The arm 12, may then form the beam of a sensitive chemical balance, or a bifilar wire suspension may be used.

For technical instruments of the type described the usual flat spiral springs may be used as a back directing force and to pass the current to the coils.

In the embodiment of my invention, shown in Figure 4, the magnets or electromagnets 1'', 2'', have vertically situated pole ends. The coil 10' is attached by means of short arms 13, to two or more vertical coil springs 14, serving as a controlling force and two of them as in- and outlet conductors for the current. This coil spring control gives with all other characteristics the same, a much smaller natural period. To the coil 10' by means of an arm 16, and a horizontal joint 17, is connected a pointer 18, rotating around the axis 20, and swinging over a scale 19.

In all described instruments the coil 10, may be enclosed in iron casings, like the casing 15, shown in Figure 4. Providing a special shape of this casing in combination with a corresponding shape of the pole ends, or a subsidiary magnetic field, the characteristics of the deflecting field can be so changed, that proportionality of the deflections to the current intensity nearly throughout the whole range may be obtained.

The casing also shields the coil against external fields and air currents, and increases the damping.

Like the first described type of instruments, shown in Figure 1, the other types also may be used to measure strong currents or voltages, the current to be measured being then passed through the windings of the electromagnet 1', 2' or 1'', 2'', and the coil energized by a constant current from a standard cell, or replaced by flat permanent magnets.

Although three forms have been shown herein in which this invention may be embodied, it is to be understood, that the invention is not limited to any particular use or to any specific construction but might be applied for any purpose and in various forms without departing from the spirit of the invention or the scope of the following claims:

What I claim is:

1. In an electrical instrument means for producing a magnetic field between similar poles, a movable coil mounted in said field with its axis substantially coinciding with the line joining said poles, means for conducting an electrical current to and from said coil and means for producing a force directing said coil back to its initial position, when moved out of it.

2. In an electrical instrument means for producing a magnetic field between like poles, a movable coil mounted in said field with its axis substantially coinciding with the line joining said poles and having an axial opening of a larger size than said poles so as to allow said coil to move freely over said poles, means for conducting an electrical current to said coil and means for producing a back directing force on said coil.

3. In an electrical instrument an iron core having a small open space between its ends, wires wound on said iron core in such a way, that a magnetic field with like poles is formed between the ends of said core, when an electric current is conducted through said wires, a movable coil mounted between said poles with its axis substantially coinciding with the line joining said poles, means for conducting an electric current to and from said coil, means for producing a back directing force on said coil and means for varying the intensity of the current, which produces said magnetic field.

4. In an electrical instrument an iron core with an open space between its ends, wires wound on said iron core in such a way that a magnetic field with like poles between the ends of said core is formed, when a current is conducted through said wires, a movable coil mounted in said magnetic field with its axis substantially on the line joining said poles, a casing of magnetic material enclosing the space provided for the movements of said coil, means for conducting an electric current to and from said coil, means for producing a back directing force on said coil and a lever mounted on a pivot at right angles to the axis of said coil and having one of its arms connected to said coil.

New York city, July 8th, 1924.

MOSES JACOBSON.